Aug. 10, 1943.  S. R. KELLER  2,326,227
TRIMMING MACHINE
Filed Sept. 30, 1942  3 Sheets-Sheet 1

Spencer R. Keller INVENTOR.

BY
Victor J. Evans & Co.
ATTORNEYS

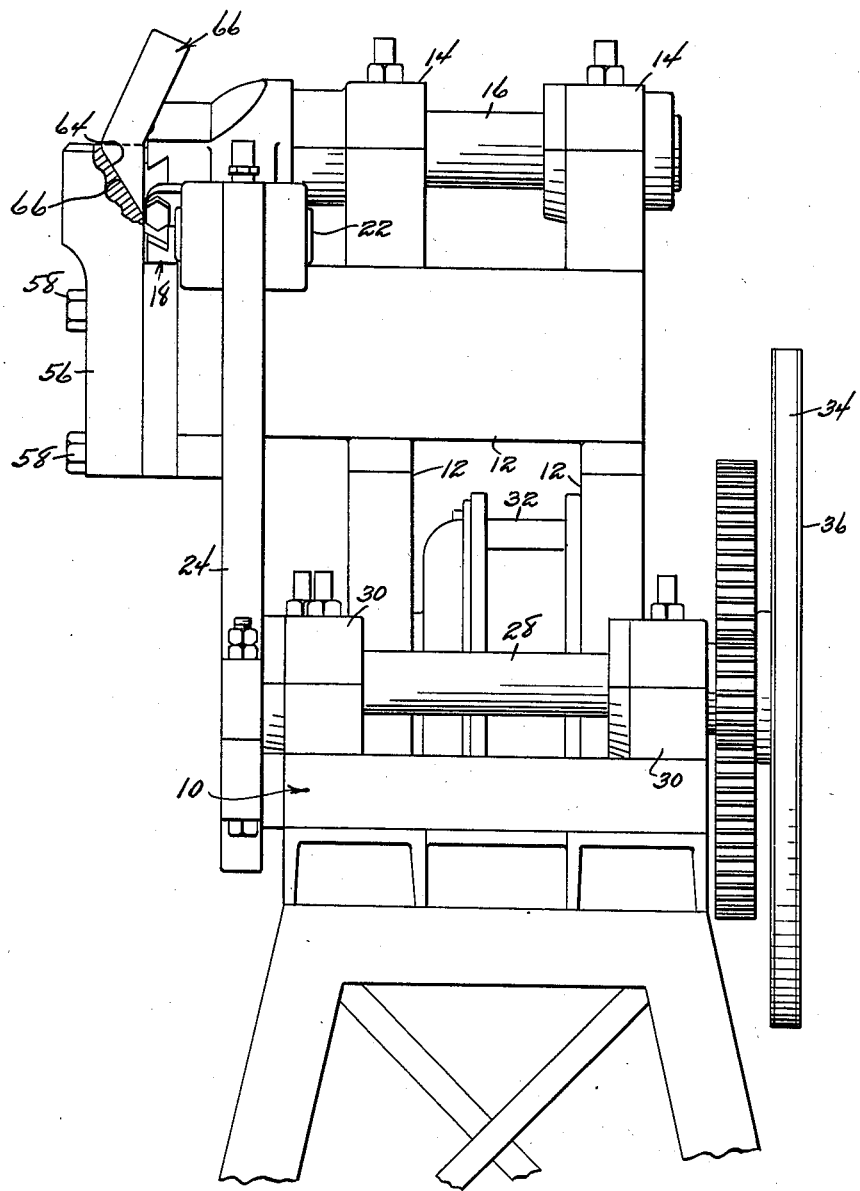

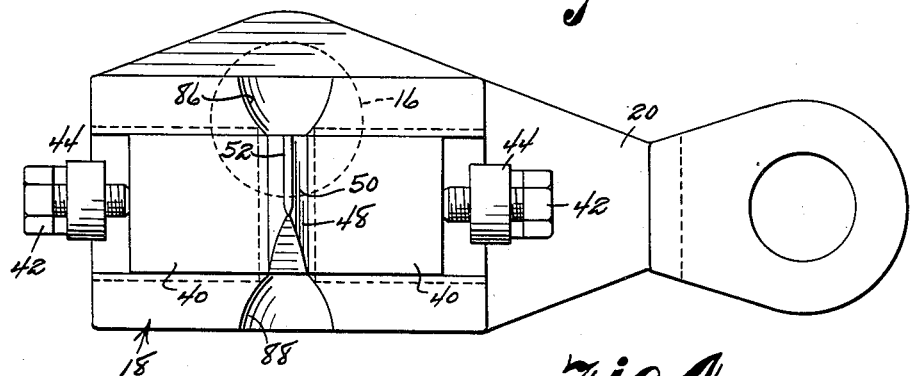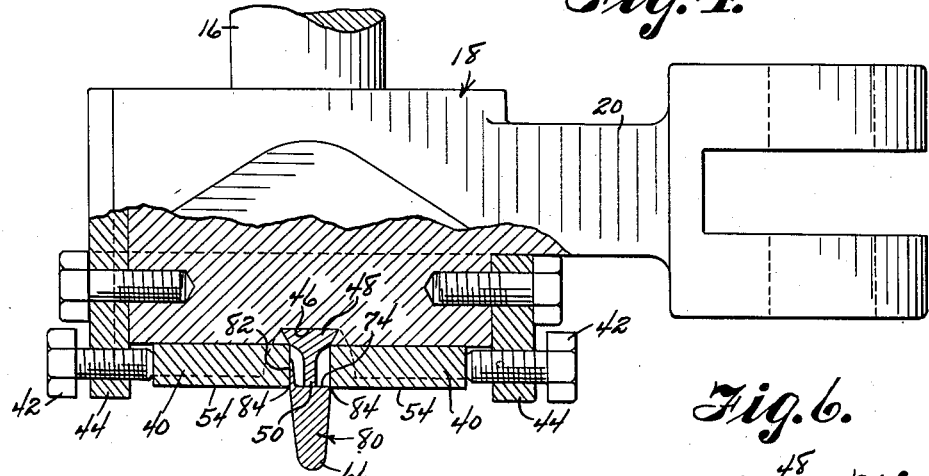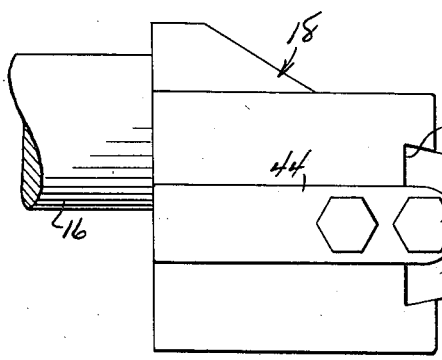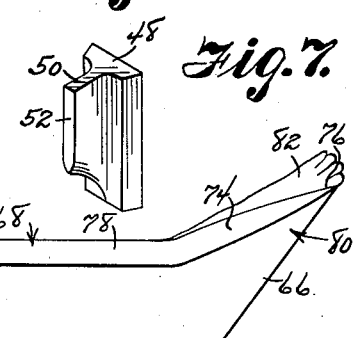

Patented Aug. 10, 1943

2,326,227

UNITED STATES PATENT OFFICE 2,326,227

TRIMMING MACHINE

Spencer R. Keller, Handley, W. Va.

Application September 30, 1942, Serial No. 460,257

7 Claims. (Cl. 164—44)

My invention relates to cutting machines, and has among its objects and advantages the provision of an improved machine for trimming cutter bits of the type employed in cutter chains of coal mining machines.

In present day methods of mining coal, kerfs or grooves are cut in the face of the vein to provide a clearance for the coal when it is blasted. Such grooves are cut through the medium of an endless chain provided with cutter bits. Such bits wear off and become dull which require replacement by sharp bits. In addition to essential sharpness, the bits must be uniform as to shape and size. Machines have been devised to shape and sharpen such bits, such as the machine disclosed in Patent No. 1,604,865, issued October 26, 1926. Such machine methods of shaping and sharpening bits are satisfactory with respect to production capacity but a large number of bits are formed with feather edges and webs which must be removed before the bit is of proper shape and sharpness.

Accordingly, an object of my invention is to provide a machine for removing feather edges and webs on cutter bits in an accurate and expeditious manner.

In the accompanying drawings:

Figure 2 is an end view with a portion broken away;

Figure 3 is a face view of the cutter assembly;

Figure 4 is a top plan view of the structure of Figure 3 with a portion broken away for the purpose of illustration;

Figure 5 is a side view of the structure of Figures 3 and 4;

Figure 6 is a perspective view of a tool positioning member;

Figure 7 is a perspective view of a portion of a conventional cutter bit illustrating objectionable web formations thereon.

Figure 1:
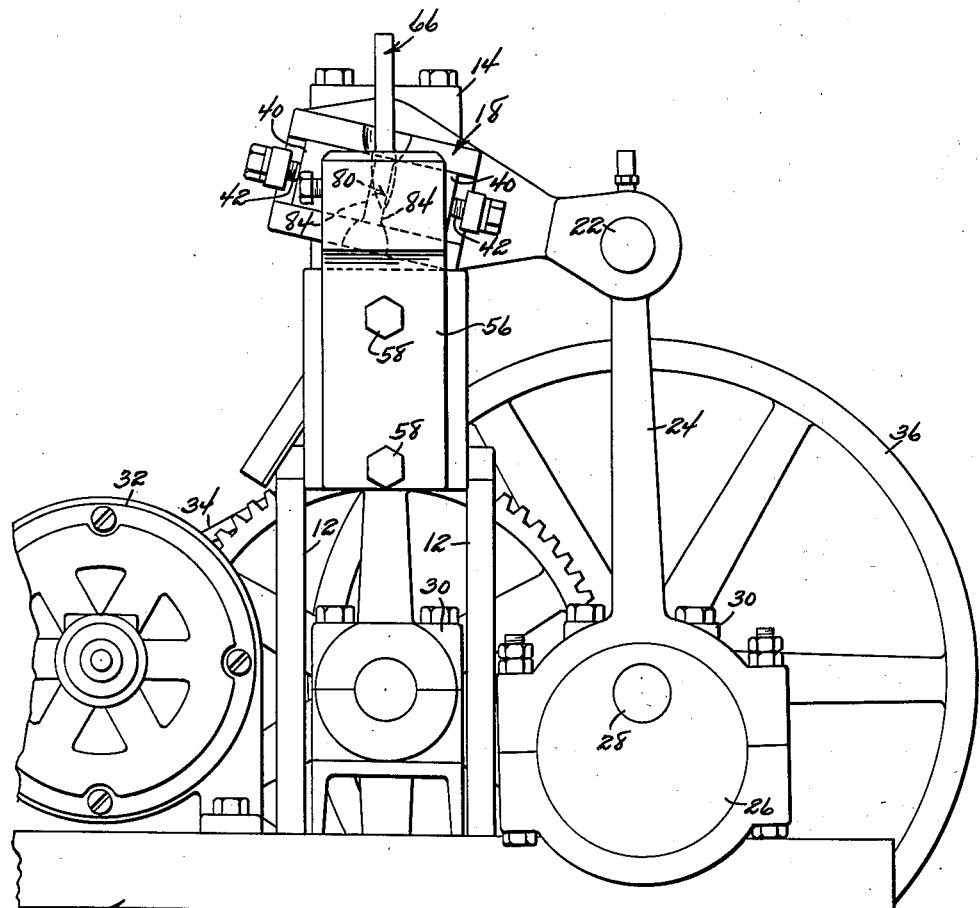
Figure 1 is a face view of a machine in accordance with my invention.

In the embodiment selected for illustration, I make use of a base frame structure 10 and an upper frame structure 12 provided with bearings 14 rotatably supporting a shaft 16. In Figures 3, 4 and 5, a cutter head 18 is fixedly secured to one end of the shaft 16, which head is provided with an arm 20 pivotally connected at 22, see Figure 1, with a crank arm 24 connected with an eccentric 26 attached to a shaft 28 supported in bearings 30 mounted on the base frame 10. Thus oscillatory motion is imparted to the cutter head 18 through rotation of the eccentric 26. A motor 32 is mounted on the base frame 10 for driving a V belt 34 passing around a relatively large sheave 36 attached to the shaft 28.

The cutter head 18 is provided with a dovetail groove 38 for the reception of two spaced cutters 40 adjustable toward and away from each other by screws 42 having end engagement with the respective cutters and threaded into supports 44 on the head 18. A dovetail groove 46 is provided in the head 18, which groove is arranged at right angles to the dovetail groove 38 for the reception of a dovetail 48 having a bit positioning web 50 having a face 52 lying in a plane common to the faces 54 of the cutters 40.

Figure 8:
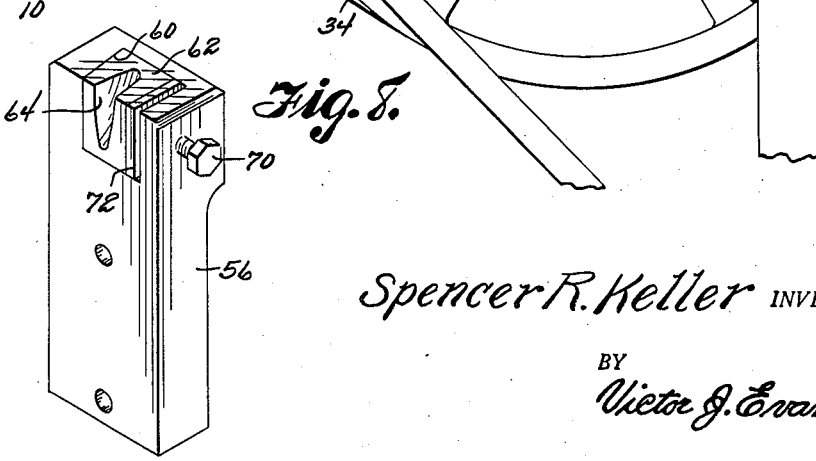
Figure 8 is a perspective view of a companion tool positioning means.

To the upper frame structure 12 is fixedly connected a body 56 by bolts 58 and having a recess 60 in its upper end, see Figure 8, for the reception of a bit holding body 62 having a groove 64 shaped to the contour of the tapered back face 66 illustrated on the bit 68 of Figure 7. The body 62 is fixedly secured in the recess 60 by reason of a setscrew 70 engaging a pressure plate 72 lying in engagement with the body 62.

Referring to Figure 7, the bit 68 is provided with a leading face 74 terminating in a sharp point 76 by reason of its intersection with the rear face 66. The face 74 is arranged at an angle to the shank 78, which is also true of the point structure 80 of the bit. Many bits are forged with a feather edge or web 82 which must be removed before the bit is of the desired shape and sharpness.

To remove the objectionable formation 82, the point structure 80 of the bit is inserted in the recess 64 with the face 74 of the bit engaging the face 52 of the web 50. This positions the face 74 in a plane common to the faces 54 of the cutters 40, so that oscillation of the head 18 will bring the cutting edges 84 into engagement with the formations 82 to sever the latter in the plane of the face 74. Figure 1 illustrates the relation of the pointed end of the bit with respect to the cutting edges 84. The head 18 is oscillated through an arc which causes each cutting edge 84 to sever the formation 82 on its respective side of the bit only. In addition, the cutting action is inwardly from the outer side of the bit so as to eliminate any projecting feather edges. The head 18 is cut away at 86 to provide clearance for the shank 78 of the bit. A recess 88 is also cut in the lower part of the head to provide clearance for material cut from the bits. The greater part of the head lies beneath the axis of the shaft 16.

Without further elaboration, the foregoing will so fully illustrate my invention, that others may, by applying current knowledge, readily adapt the same for use under various conditions of service.

I claim:

1. A machine for trimming cutter bits having a work face and obstructive formations projecting beyond the face comprising an oscillatory head having spaced cutting means thereon, a cutter bit stop located between said cutting means and engageable with said work face to hold the work face in the plane of said cutting means, a cutter bit support for positioning the cutter bit against said stop, and means for oscillating said head to bring said cutting means alternately into trimming engagement with the obstructive formations.

2. A machine for trimming cutter bits having a work face and obstructive formations projecting beyond the face comprising an oscillatory head having spaced cutting means thereon, a cutter bit stop located between said cutting means and engageable with said work face to hold the work face in the plane of said cutting means, a cutter bit support for positioning the cutter bit against said stop, and means for oscillating said head to bring said cutting means alternately into trimming engagement with the obstructive formations and inwardly of said face.

3. The invention described in claim 1 wherein said cutter bit support comprises a relatively stationary body having an angular recess shaped to receive the bit portion of the cutter bit to urge the latter against said stop.

4. The invention described in claim 1 wherein said cutting means are adjustably mounted on said head for relative adjustment toward and away from each other.

5. The invention described in claim 1 wherein said head is provided with a dovetail groove and in which said cutting means comprise dovetail bodies slidable in said groove, and screws threaded in said head and respectively engageable with said dovetail bodies to hold the latter in predetermined spaced relationship.

6. The invention described in claim 1 wherein there is provided a frame structure, a shaft fixed to said head and mounted for oscillation on the frame structure, an arm fixed to said head, a drive shaft mounted on said frame structure and having an eccentric, and an operating connection between said arm and the eccentric.

7. A machine for trimming cutter bits having work faces and obstructive formations thereon projecting beyond the work faces comprising movable and spaced cutting means, a cutter bit support for holding the cutter bit in trimming relationship with said cutting means, stop means coacting with said cutter bit support for positioning the work faces in the planes of said cutting means, and means for bringing said cutting means into alternate engagement with obstructive formations.

SPENCER R. KELLER.